Figure 1:
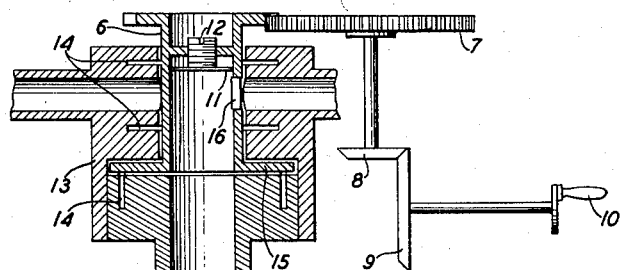

Aug. 14, 1951     C. C. CUTLER     2,563,990
WAVE GUIDE SWITCHING ARRANGEMENT
Filed Sept. 23, 1944

INVENTOR
C. C. CUTLER
BY
J. W. Schmied
ATTORNEY

Patented Aug. 14, 1951

2,563,990

UNITED STATES PATENT OFFICE 2,563,990

WAVE GUIDE SWITCHING ARRANGEMENT

Cassius C. Cutler, Oakhurst, N. J., assignor to Bell Telephone Laboratories, Incorporated, New York, N. Y., a corporation of New York Application September 23, 1944, Serial No. 555,423

2 Claims. (Cl. 250—33)

This invention relates to ultra-high frequency radiated transmission.

An object of the invention is to conveniently and expeditiously change rapidly from one direction of transmission to another or rapidly in succession from one to another of a series of directions of transmission.

Let it be assumed that it is desired to sweep over a portion of the horizon with ultra-high frequency radiation in order to detect an object, for example, an iceberg, by reflected energy and indicate its directions or, for example, to locate and transmit to a distant receiving station, which upon receiving the radiated energy would transmit back and thereby establish communication or would transmit back for the purpose of indicating the direction of the receiving station.

A further object of the invention is to provide a micro-wave transmission system for two-way communication between two stations constructed in accordance with an embodiment of the invention or between one such station and an equivalent station.

A feature of the invention comprises the utilization of receiving, detecting and utilizing means for ultra-high frequency waves which performs the dual purpose of checking the accuracy with which the radiated waves are transmitted to a desired cooperative receiving station and receiving wave energy sent back in the course of the two-way communication.

For these and other similar or analogous purposes the means, methods and apparatus characteristic of, embodying, or operating in accordance with the present invention may be utilized.

In order to practice the invention use is made for generating and coupling means for producing ultra-high frequency waves whereby the source is coupled to a principal wave guide and to this wave guide is connected a branch wave guide for receiving, detecting and utilizing ultra-high frequency waves. Also connected to the wave guide is a rotating head which serves to distribute the wave energy to be radiated to a number of branch wave guides each of which is arranged to impinge its wave energy upon a paraboloid-shaped reflector or radiator which also serves to collect returning wave energy and return it into the branch wave guide, thence through the rotating head and thence through the main wave guide and the receiving branch wave guide to operate receiving and detecting means responsive to ultra-high frequency waves.

The dimensions of the wave guides and other parts utilized in the invention are proportioned in accordance with the frequencies of waves to be transmitted and received. In a representative case, for example, the waves might be of a frequency corresponding to a wavelength of 10 centimeters in free space but the principles of the invention may be applied over a wide range of frequencies of, for example, from 1 centimeter to 100 centimeters. For illustrative purposes it will be assumed that the wavelength to be employed is 10 centimeters and that parts of the apparatus and equipment are proportioned appropriately to this wavelength.

Figure 2:
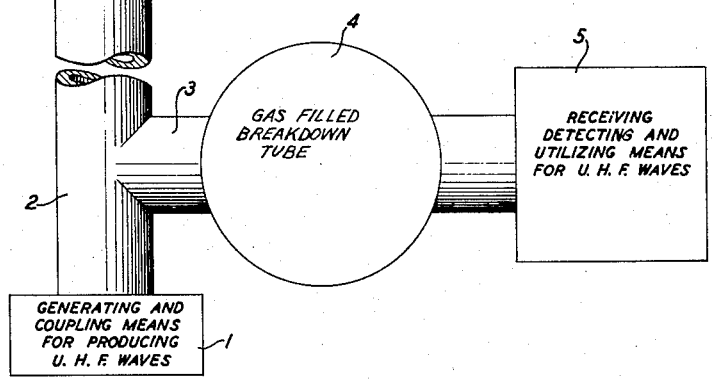
Figure 2:
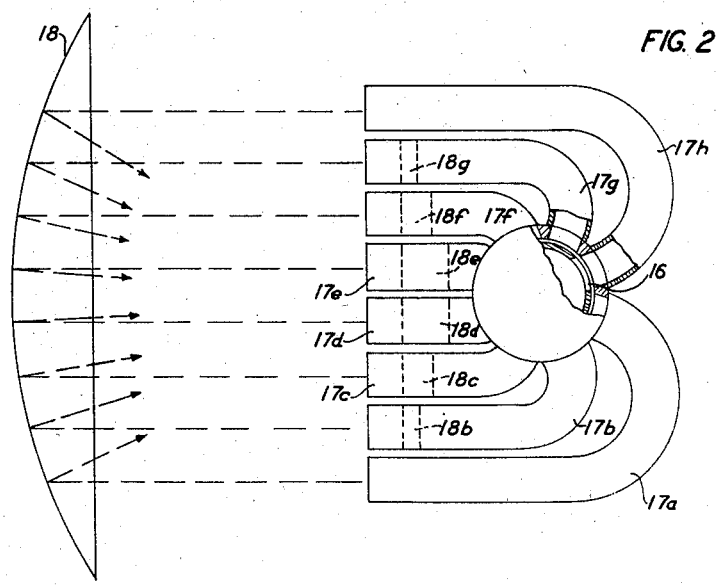

Reference will now be made to the accompanying drawings in which:

Fig. 1 illustrates the rotating head in cross-section, the other apparatus being indicated diagrammatically;

Fig. 2 indicates the relation of the branch wave guides to the paraboloidal reflector.

In order to more concisely describe the invention devices which are known in the art will be referred to rather than described in detail.

A rectangle 1 designated "Generating and coupling means for producing U. H. F. waves" indicates means known in the art for generating successive groups of ultra-high frequency waves and supplying them through a suitable coupling means to a wave guide 2 in which there will be produced waves of the type commonly known as $TM_{0,1}$ waves (in circular guide). A suitable mode of operation, for example, is to produce a 1 microsecond pulse of 10 centimeter waves, followed by a pause of a few thousandths of a second, followed by other groups or pulses of 1 microsecond 10 centimeter waves, etc. Instrumentalities as indicated by the rectangle 1 are disclosed in the application of A. L. Samuel, Serial No. 474,122, filed January 30, 1943, and the application of H. T. Friis, Serial No. 474,164, filed January 30, 1943, the disclosures of which, to the extent that they relate to apparatus such as indicated by the rectangle 1, are incorporated by reference herein to the same extent as though they were set forth herein in full.

The apparatus 4 comprises, in general, a receiver-detecting arrangement and includes a gas-filled tube which breaks down under the influence of high energy transmitted waves, thereby preventing their energy from arriving at the apparatus 5 and destroying or impairing the said apparatus. The tube incorporated in the detecting apparatus 4 immediately becomes restored upon cessation of transmission to a condition wherein it freely transmits waves of low energy received from a distant transmitting station or reflected from a distant object and passes them on to the apparatus 5 by means of which they are detected and indicated. As indicated in the Samuel application aforesaid the apparatus 4 includes a resonant cavity and functions as a gas tube type switch.

The energy of these waves traveling in an upward direction through the wave guide 2 will energize a branch wave guide 3 in a manner to impart considerable energy thereto and the wave guide 3 includes a receiver protecting means 4. The receiving protector means 4 consists, in general, of an evacuated vessel filled with a suitable amount of gas which breaks down upon the first wave impulse transmitted from source 1, because the energy supplied from the source 1 is considerable, and protects the receiving equipment 5 from the effects of the transmitted energy.

The receiving equipment 5 consists of receiving, detecting and utilizing means for ultra-high frequency waves of a type which is also known in the art. For a description of the devices 4 and the equipment 5 reference is again made to the application of Samuel, supra, and the application of Friis, supra, the disclosures of which, in so far as they relate to the device 4 or the equipment 5, are incorporated herein by reference to the same extent as though they were set forth in full. Consequently, it will be seen that groups of ultra-high frequency waves may pass from the device 1 to the wave guide 2 into the upper end of the wave guide which comprises a rotating head 6. This rotating head may be coupled by means of gears 7, 8, 9 to a gear which may be driven manually by handle 10. Handle 10 indicates any suitable means either manual or power actuated for rotating the head 6 one step at a time or continuously either in a slow or fairly rapid manner. The upper end of the head may have its effective length adjusted by means of a piston 11 which may be elevated or lowered by means of a screw 12. The rotating head rotates in a fitting 13 and the fitting 13 and the upper end of the wave guide is provided with several radial slots 14 which are one quarter wavelength deep to reduce leakage of energy to the outside of the head. Flange 15 also tends to reduce leakage of energy to the outside of the structure.

The rotating head has a single rectangular slit 16 whose height may be approximately equal to or slightly greater than the diameter of branch wave guides 17, 17a, 17b, etc., and whose width may be approximately equal to or slightly less than the internal diameter of one of the same branch wave guides. As shown in Fig. 2, upon rotation of the head the slit or opening 16 will come successively in front of the several wave guides 17a to 17h which will cause these branch wave guides to be traversed in succession by a wave on the same frequency, namely, that frequency corresponding to 10 centimeters wavelength in free space. The mouths of the branch wave guides 17a to 17h are arranged in a linear direction with respect to each other so that each of them tends to direct radiated energy at a paraboloid 18 which is indicated diagrammatically and which in the general case will comprise a paraboloid surface of dimensions relatively large with respect to the aggregate dimensions of all the wave guides 17a to 17h so that substantial energy will be radiated from the paraboloid 18 in a direction back toward the wave guide structure and past the same into space. The wave traversing each branch wave guide will, in general, be a wave known as a $TE_{1,1}$ wave (circular guide) or $TE_{1,0}$ in rectangular guide. However, in its generic aspects, this invention is not limited to particular types of waves and any type of wave which would give the desired result is considered to be within the scope of the invention.

As the rotating head 6 turns in such a manner as to pass the opening 16 consecutively in front of the various branch wave guides 17a to 17h, inclusive, there will be times of overlap when wave energy is being transmitted through two adjacent guides and other times when the wave energy is substantailly restricted to one guide. In order that the wave energy to the various branch guides may be in agreement as to polarization and phase or polarization or phase, the waves in the shorter subguides may be delayed by a suitable delay means or filter which may comprise various forms. Specifically, it may be assumed that a section of dielectric other than air, for example polystyrene, of a suitable length may be included in certain of the wave guides to equalize the wavelengths of the guides as a whole. Thus, since the branch wave guides 17d and 17e are the shortest, they may have the longest section of polystyrene 18d and 18e; the wave guides 17c and 17f may have smaller sections 18c and 18f and the branch guides 17b and 17g still smaller sections 18b and 18g, respectively. The longer guides 17a and 17h may be free of polystyrene if the axial length of material included in the others is sufficient to equalize the effective wavelengths to guides. In some instances where the difference in the effective wavelengths of the guide is greater than a whole wavelength, some of the shorter members might also be free of filters or delay means.

Let it be assumed that a wave issuing from a single guide, for example 17a, is radiated and reflected from the paraboloid in such a manner as to cover an arc of three degrees effectively, that is, the energy radiated and reflected in a direction one and one-half degrees on each side from the center of the beam is 50 per cent less than the energy in the center of the beam. Then with eight branch wave guides so arranged with respect to the paraboloid that each radiates a beam whose center is three degrees from the beam radiated by the next adjacent branch wave guide a total arc of twenty-four degrees may be covered. These figures are merely illustrative and the arc may be greater or less and the number of branch wave guides greater or less as conditions may require.

The apparatus may be operated in several different manners for different purposes. By way of illustration let it be assumed that it is required to scan rapidly a portion of the horizon as viewed from a ship to determine the presence of an iceberg or other obstruction within the range of the equipment. Generating means 1 may be set, for example, to produce a pulse of approximately 1 microsecond of ultra-high frequency waves in the range of frequencies corresponding to around 10 centimeters wavelength in free space at intervals every one wave group over 0.01 second. The rotating head 6 could be rotated at such a speed that ten such groups of waves, for example, could be radiated from each branch wave guide in succession. As is well known, the means and methods of producing such groups of waves of considerable energy are well known in the art.

It is also known how the devices 4 function to protect the receiving and detecting apparatus 5 from the high energy of these outgoing waves but leaving them responsive to relatively feeble but similar waves incoming whose energy travels through the wave guide in a downward direction in Fig. 1. As the rotating head is rotated to scan a portion of the horizon, let it be assumed that during the time operation is proceeding from a particular one of the branch wave guides 17a to 17h and in a particular direction the radiation impinges upon an object, such as an iceberg or another vessel, or any other wave reflecting object at a distance of a few up to several miles. When this takes place a reflected wave will return from the object, strike the paraboloid 18 and be returned through a particular branch wave guide through which the radiation which caused the reflected wave was transmitted or in some instances through two adjacent wave guides and converted in the wave guide system, which includes, the rotating head, to produce a relatively feeble wave traversing the main wave guide 2 in a downward direction and being induced by appropriate means into the wave guide 3 to operate the receiving, detecting and utilizing means 5 of a type well known in the art to indicate the presence of the reflecting object. In the case of this returning wave the devices 4 will not break down because the returning wave is relatively feeble and the wave energy will be transmitted to effect the receiving instrumentailities 5. It will be understood that the devices 4 are of such a nature that upon receiving the first cycle of a high power outgoing wave a gaseous discharge tube incorporated in the equipment will break down almost instantly and protect the receiving equipment 5 but upon the cessation of the high power outgoing wave the gaseous discharge tube incorporated in the equipment 4 will resume its normal condition sufficiently soon so that a return wave will find the equipment 4 in condition to pass the energy into the receiving instruments 5. By this means an operator may operate the crank 10 manually and upon receiving an indication the operation of the crank may temporarily be stopped and note taken of the direction of the rotated object causing the reflected wave.

Upon thus rapidly scanning the horizon and ascertaining the neighborhood and approximate direction of a reflecting object the exact bearing of the object may, if necessary, be determined more accurately by other means. Such other means may be other means not constituting a part of the present invention or it may be a duplicate of the equipment disclosed which instead of radiating a beam of energy three degrees wide may be designed to radiate a more narrow beam. For many purposes location of an object within a range of three degrees may be quite satisfactory and sufficient without the use of equipment for locating its direction more accurately.

The equipment disclosed may be utilized in other means for other purposes. Let it be supposed, for example, that two ships invisible to each other on account of fog each possesses an equipment of the kind described. Each one could not only scan the horizon to determine the direction of the other but once having determined the direction they could stop the scanning operation and continue to direct energy at the other vessel at intervals for the purpose of signaling to or communicating with other other. For this purpose the radiated ultra-high frequency wave groups could be combined in accordance with codes such as the Morse code. Each vessel could transmit to theother while the transmitter of the other was quiescent and convey a desired signal or communication the reception of which at the desired location would be checked to a certain extent by the reflected wave whereupon the active transmitter would be rendered inactive and the receiving transmitter rendered active for the purpose of replying to the communication. The received waves could be indicated by equipment 5 of the kind known in the art, thus, for example, cathode ray tubes with luminescent screens would indicate the signals so that they could be read in Morse or other code by one familiar with the code or other codes or other indicating means could be used.

As a specific detecting and indicating means there may be used any of the detectors disclosed in Southworth Patent 2,142,159, granted January 3, 1939, having its output resistively coupled to the deflecting coils of a cathode ray tube as per Fig. 35 of A. Hund on High Frequency Measurements, Edition I, 1933, with or without a suitable oscillator or sweep circuit deflecting voltage connected to the other terminals of the tube.

There is therefore disclosed not only elements of a detecting system for detecting adjacent objects but also the essential elements of an ultra-high frequency two-way communication system in which adjacent stations sufficiently near to each other in range may communicate with one another.

In accordance with this specification and the amended claims, the terms wave guide, radiation, reception, and transmission, all relate to instrumentalities and operations involving electromagnetic waves as distinguished from sound waves, and all parts of the specification, drawing and claims are to be construed accordingly.

What is claimed is:

1. An electrical energy transferring system comprising a tubular uni-conductor wave guide terminating in a rotating head with an opening, means for presenting said opening in succession to each of a plurality of branch tubular uni-conductor wave guides associated with said rotating head, said branch wave guides being designed to radiate energy in the same direction and delay means associated with certain of said guides whereby their effective wavelengths for a given frequency and adjusted so that all have a wavelength of $m$ degrees plus $2\pi n$ degrees, where $m$ represents any real positive number and $n$ represents zero or any real integer.

2. Apparatus for signaling by electromagnetic waves in the millimeter to meter wavelength range comprising a wave guide, a source for supplying wave energy in the wavelength range specified to said guide at one point, said guide including an external wall a portion of which is rotatable around the central longitudinal axis of said guide, said wall of said rotatable portion having a single opening at one position therein, a structure fixed in contiguous physical relation to said wall and having a substantially continuous electrical connection therebetween to prevent leakage of said wave energy, said structure comprising a plurality of wave guides one end of each of which terminates adjacent to a circumference through which said single opening passes as said rotatable portion is rotated, said last-named wave guides being of unequal physical length, and means included in said guides to regulate the relative phases of wave energy passing through each thereof from one end of it to the other end to other than what the phases would be if they depended solely on the relative lengths of said guides.

CASSIUS C. CUTLER.

REFERENCES CITED

The following references are of record in the file of this patent:

UNITED STATES PATENTS

| Number | Name | Date |
|---|---|---|
| 426,450 | Albizu | Sept. 15, 1885 |
| 701,166 | Meulemeester | May 27, 1902 |
| 1,516,029 | Sturtevant | Nov. 18, 1924 |
| 1,733,718 | Blondel | Oct. 29, 1929 |
| 2,002,181 | Ilberg | May 21, 1935 |
| 2,083,242 | Runge | June 8, 1937 |
| 2,129,669 | Bowen | Sept. 13, 1938 |
| 2,129,712 | Southworth | Sept. 13, 1938 |
| 2,134,716 | Gunn | Nov. 1, 1938 |
| 2,146,724 | Dunmore | Feb. 14, 1939 |
| 2,157,122 | Dunmore | May 9, 1939 |
| 2,159,937 | Zworykin | May 23, 1939 |
| 2,217,321 | Runge et al. | Oct. 8, 1940 |
| 2,360,219 | Goddard | Oct. 10, 1944 |
| 2,396,044 | Fox | Mar. 5, 1946 |
| 2,396,112 | Morgan | Mar. 5, 1946 |
| 2,405,239 | Seeley | Aug. 6, 1946 |
| 2,407,199 | Wolff | Sept. 3, 1946 |
| 2,408,848 | Hammond | Oct. 8, 1946 |
| 2,412,703 | Wolff | Dec. 17, 1946 |
| 2,416,675 | Beck et al. | Mar. 4, 1947 |
| 2,423,508 | Leck | July 8, 1947 |
| 2,433,368 | Johnson | Dec. 30, 1947 |
| 2,442,951 | Iams | June 8, 1948 |
| 2,460,401 | Southworth | Feb. 1, 1949 |
| 2,464,276 | Varian | Mar. 15, 1949 |